United States Patent
Harvey et al.

(10) Patent No.: US 10,471,831 B2
(45) Date of Patent: Nov. 12, 2019

(54) HANDLING A FAULT CONDITION ON A LITHIUM-BATTERY-POWERED UTILITY VEHICLE

(71) Applicant: Textron Innovations Inc., Providence, RI (US)

(72) Inventors: Arthur James Harvey, Beech Island, SC (US); Norman R. Padgett, Evans, GA (US); John Ledden, Augusta, GA (US); Luke Anthony O'Hara, Augusta, GA (US)

(73) Assignee: Textron Innovations Inc., Providence, RI (US)

( * ) Notice: Subject to any disclaimer, the term of this patent is extended or adjusted under 35 U.S.C. 154(b) by 130 days.

(21) Appl. No.: 15/419,570

(22) Filed: Jan. 30, 2017

(65) Prior Publication Data
US 2018/0186241 A1 Jul. 5, 2018

Related U.S. Application Data

(60) Provisional application No. 62/440,599, filed on Dec. 30, 2016.

(51) Int. Cl.
*B60L 3/04* (2006.01)
*B60L 3/00* (2019.01)
(Continued)

(52) U.S. Cl.
CPC .............. *B60L 3/04* (2013.01); *B60L 3/0046* (2013.01); *B60L 3/0061* (2013.01);
(Continued)

(58) Field of Classification Search
CPC ...... B60L 3/04; B60L 11/1861; B60L 3/0061; B60L 3/0076; B60L 2200/22;
(Continued)

(56) References Cited

U.S. PATENT DOCUMENTS

| 5,934,051 A | 8/1999 | Hahn |
| 7,332,881 B2 | 2/2008 | Clark et al. |

(Continued)

OTHER PUBLICATIONS

Garia, "Introducing the New Garia Golf", http://www.garia.com/news/introducing-the-new-garia-golf/, Sep. 15, 2016.

*Primary Examiner* — Jeffrey C Boomer
(74) *Attorney, Agent, or Firm* — BainwoodHuang

(57) ABSTRACT

A control system for handling a fault condition on a utility vehicle includes a lithium battery, a contactor configured to control electrical access to the lithium battery, and control circuitry coupled with the lithium battery and the contactor. The control circuitry is configured to detect, while the contactor is closed to provide a set of loads of the utility vehicle with electrical access to the lithium battery, onset of a fault condition. The control circuitry is further configured to perform, in response to detection of the onset of the fault condition, a set of remedial operations to address the fault condition. The control circuitry is further configured to perform, after a predefined amount of time has elapsed since the onset of the fault condition, a subsequent operation which opens the contactor if the fault condition remains and maintains closure of the contactor if the fault condition does not remain.

21 Claims, 10 Drawing Sheets

(51) Int. Cl.
*H01M 10/44* (2006.01)
*B60L 3/12* (2006.01)
*B60L 7/10* (2006.01)
*B60L 53/14* (2019.01)
*H01M 10/052* (2010.01)
*H01M 10/48* (2006.01)
*H01M 10/42* (2006.01)
*B60L 58/12* (2019.01)

(52) U.S. Cl.
CPC ............ *B60L 3/0076* (2013.01); *B60L 3/12* (2013.01); *B60L 7/10* (2013.01); *B60L 53/14* (2019.02); *B60L 58/12* (2019.02); *H01M 10/425* (2013.01); *H01M 10/44* (2013.01); *H01M 10/48* (2013.01); *B60L 2200/22* (2013.01); *B60L 2240/545* (2013.01); *B60L 2240/547* (2013.01); *B60L 2240/549* (2013.01); *B60L 2240/80* (2013.01); *H01M 10/052* (2013.01); *H01M 10/486* (2013.01); *H01M 2220/20* (2013.01); *Y02E 60/122* (2013.01); *Y02T 10/7011* (2013.01)

(58) Field of Classification Search
CPC .... H01M 10/48; H01M 10/0525; H01M 2/34; H01M 2010/4271; H01M 2220/20
See application file for complete search history.

(56) References Cited

U.S. PATENT DOCUMENTS

| | | | |
|---|---|---|---|
| 7,560,882 B2 | 7/2009 | Clark et al. | |
| 7,800,345 B2 | 9/2010 | Yun et al. | |
| 7,825,616 B2 | 11/2010 | Clark et al. | |
| D652,349 S | 1/2012 | Kristensen | |
| 8,120,291 B2 | 2/2012 | Clark et al. | |
| 8,596,391 B2 | 12/2013 | Kshatriya | |
| 8,604,749 B2 | 12/2013 | Kwag et al. | |
| 8,714,572 B1 | 5/2014 | Singletary et al. | |
| 9,050,899 B2 | 6/2015 | Seol | |
| 9,371,067 B2 | 6/2016 | Dao et al. | |
| 9,387,775 B2 | 7/2016 | Baek et al. | |
| 9,436,261 B2 | 9/2016 | Yun | |
| 9,508,982 B2 | 11/2016 | Keigler et al. | |
| 9,553,460 B2 | 1/2017 | Dao et al. | |
| 9,592,743 B2 | 3/2017 | Haug | |
| 9,595,847 B2 | 3/2017 | Dao et al. | |
| 9,806,341 B2 | 10/2017 | Lee et al. | |
| 9,806,545 B2 | 10/2017 | Fink | |
| 2003/0030322 A1* | 2/2003 | Yokoyama | B60T 8/3255 303/122.04 |
| 2008/0121443 A1* | 5/2008 | Clark | B60L 3/108 180/65.1 |
| 2012/0186888 A1* | 7/2012 | Ross | B60K 1/04 180/65.31 |
| 2013/0197734 A1* | 8/2013 | Okura | B60L 11/1822 701/22 |
| 2013/0200690 A1* | 8/2013 | Rini | H02J 7/0031 307/9.1 |
| 2013/0241502 A1 | 9/2013 | Sowden | |
| 2015/0153415 A1* | 6/2015 | Fink | G01R 31/3662 324/430 |
| 2016/0064779 A1* | 3/2016 | Takahashi | H01M 10/4242 429/61 |
| 2017/0085138 A1* | 3/2017 | Nakano | H02K 1/14 |
| 2017/0120770 A1* | 5/2017 | Huynh | H02J 7/0031 |
| 2017/0120771 A1* | 5/2017 | Alser | B60K 1/04 |
| 2018/0215363 A1* | 8/2018 | Kita | B60T 13/161 |

* cited by examiner

HANDLING A FAULT CONDITION ON A LITHIUM-BATTERY-POWERED UTILITY VEHICLE

BACKGROUND

Conventional lithium-battery systems provide lithium-battery power to electrical loads. A typical lithium-battery system includes a lithium-battery pack and a safety circuit that disconnects the lithium-battery pack from the electrical loads if an unsafe condition is sensed.

Some electric vehicles utilize power from lithium-battery packs. For such a vehicle, a contactor typically operates as the disconnection mechanism that disconnects the vehicle's lithium-battery pack from the vehicle's electrical loads. Along these lines, when the vehicle's safety circuit detects the presence of an unsafe condition, the vehicle's safety circuit immediately opens the contactor thus disconnecting the vehicle's lithium-battery pack from the vehicle's electrical loads.

SUMMARY

It should be understood that there are deficiencies to the above-described conventional electric vehicle that immediately opens the contactor to the vehicle's lithium-battery pack upon detection of an unsafe condition. For example, some electric vehicles implement speed control and there is a sudden loss of speed control as soon as the contactor opens. As another example, some electric vehicles may utilize an electric parking brake which disengages only when energized. Accordingly, if the contactor immediately opens, the electric parking brake of the electric vehicle will immediately engage thus suddenly stopping the electric vehicle and providing an unpleasant experience to the driver.

Improved techniques are directed to providing control circuitry of a utility vehicle with time (e.g., a predefined amount of time) to react in response to detection of a fault condition before the control circuitry determines whether to disconnect a lithium battery of the utility vehicle. This allows time for the control circuitry to react in a way that either clears the fault condition or slows down the utility vehicle before disconnecting the lithium battery. Such operation provides an opportunity for the fault condition to be corrected thus avoiding disconnection as well as enables the utility vehicle to come to a more gradual stop if the fault condition is not corrected.

One embodiment is directed to a control system for a utility vehicle. The control system includes a lithium battery, a battery contactor configured to control electrical access to the lithium battery, and control circuitry coupled with the lithium battery and the battery contactor. The control circuitry is configured to detect, while the battery contactor is closed to provide a set of loads of the utility vehicle with electrical access to the lithium battery, onset of a fault condition. The control circuitry is further configured to perform, in response to detection of the onset of the fault condition, a set of remedial operations to address the fault condition. The control circuitry is further configured to perform a subsequent operation after a predefined amount of time has elapsed since the onset of the fault condition. The subsequent operation (i) opens the contactor if the fault condition remains and (ii) maintains closure of the contactor if the fault condition does not remain.

In some arrangements, the set of loads of the utility vehicle includes a motor which is configured to provide motion to the utility vehicle. In these arrangements, the control circuitry includes a lithium battery management system (BMS) controller coupled with the lithium battery and the contactor. The lithium BMS controller is configured to identify fault situations that impact the lithium battery. In these arrangements, the control circuitry further includes a motor controller coupled with the lithium BMS controller and the motor. The motor controller is configured operate the motor based on the fault situations which are identified by the lithium BMS controller.

In some arrangements, the motor controller is configured to perform a set of decision making operations based on the fault situations which are identified by the lithium BMS controller. In these arrangements, the motor controller is further configured to control the motor based at least in part on a set of results of the set of decision making operations.

In some arrangements, the lithium BMS controller is configured to perform a set of decision making operations based at least in part on the fault situations which are identified by the lithium BMS controller. In these arrangements, the motor controller is configured to control the motor based on a set of results of the set of decision making operations.

In some arrangements, the motor controller is configured to reduce the speed of the motor to slow the utility vehicle in response to the fault situations which are identified by the lithium BMS controller.

Another embodiment is directed to a utility vehicle which includes a utility vehicle body, a motor supported by the utility vehicle body, and a control system coupled with the motor. The control system includes a lithium battery, a battery contactor configured to control electrical access to the lithium battery, and control circuitry coupled with the lithium battery and the battery contactor. The control circuitry is configured to:

(A) while the battery contactor is closed to provide the motor with electrical access to the lithium battery, detect onset of a fault condition, (B) in response to detection of the onset of the fault condition, perform a set of remedial operations to address the fault condition, and (C) after a predefined amount of time has elapsed since the onset of the fault condition, perform a subsequent operation which (i) opens the contactor if the fault condition remains and (ii) maintains closure of the contactor if the fault condition does not remain.

Yet another embodiment is directed to a method of handling a fault condition which is performed in a lithium-battery powered utility vehicle. The method includes:

(A) while a battery contactor is closed to provide a motor of the lithium-battery powered utility vehicle with electrical access to the lithium battery, detecting onset of a fault condition, (B) in response to detection of the onset of the fault condition, performing a set of remedial operations to address the fault condition, and (C) after a predefined amount of time has elapsed since the onset of the fault condition, performing a subsequent operation which (i) opens the contactor if the fault condition remains and (ii) maintains closure of the contactor if the fault condition does not remain.

Other embodiments are directed to higher and lower level systems, assemblies, apparatus, processing circuits, etc. Some embodiments are directed to various processes, electronic components and circuitry which are involved in handling a fault condition on a lithium-battery powered utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to providing control circuitry of a utility vehicle with time (e.g., a predefined amount of time) to react in response to detection of a fault condition before the control circuitry determines whether to disconnect a lithium battery of the utility vehicle. This predefined amount of time enables the control circuitry to react in a way that clears the fault condition and/or slows down the utility vehicle before disconnecting the lithium battery. Such operation provides an opportunity for the fault condition to be corrected (thus avoiding the need to disconnect the lithium battery) as well as enables the utility vehicle to come to a more gradual stop if the fault condition is not corrected.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
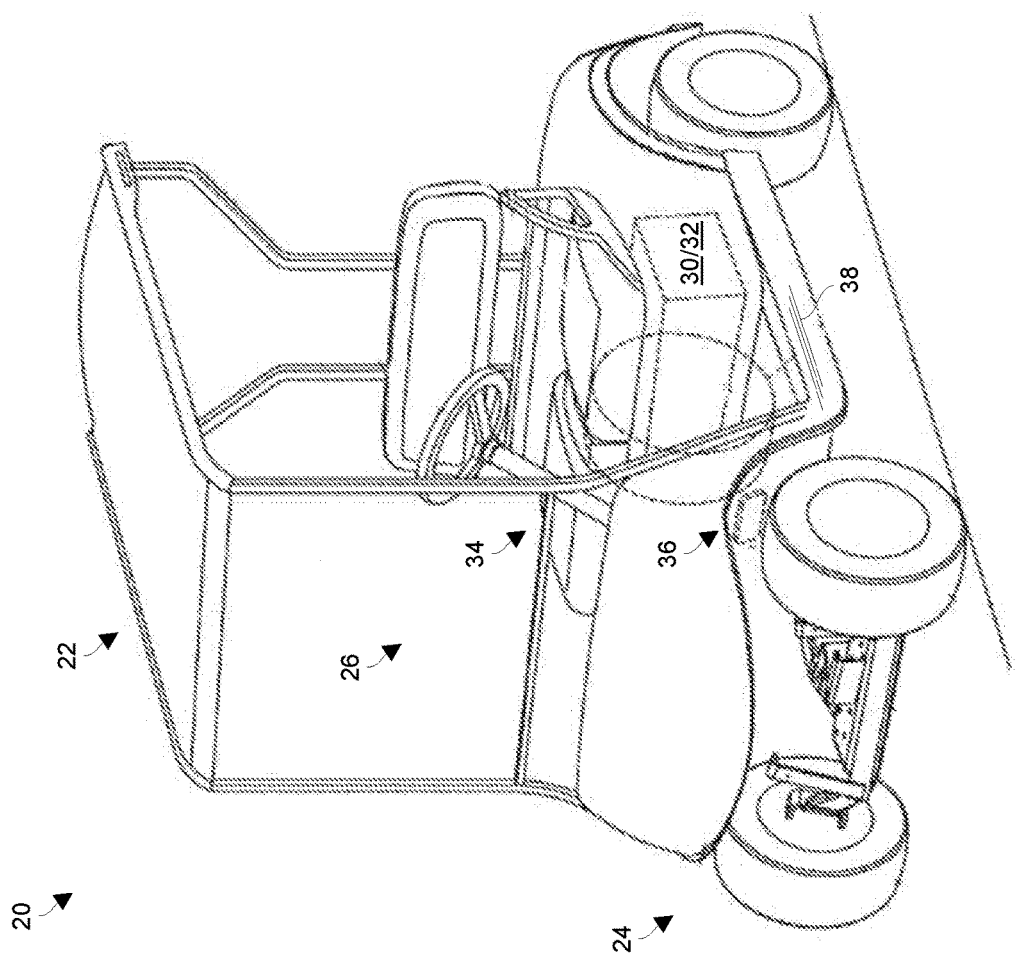
FIG. 1 is a perspective view of an example utility vehicle which controls electrical access to a lithium battery.

FIG. 1 shows an example utility vehicle 20 which controls electrical access to a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a lithium battery system 32, and additional components 34 such as a set of user controls 36 (e.g., a foot pedal, a keyed switch, a maintenance switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging. Further details will now be provided with reference to FIGS. 2 and 3.

Figure 2:
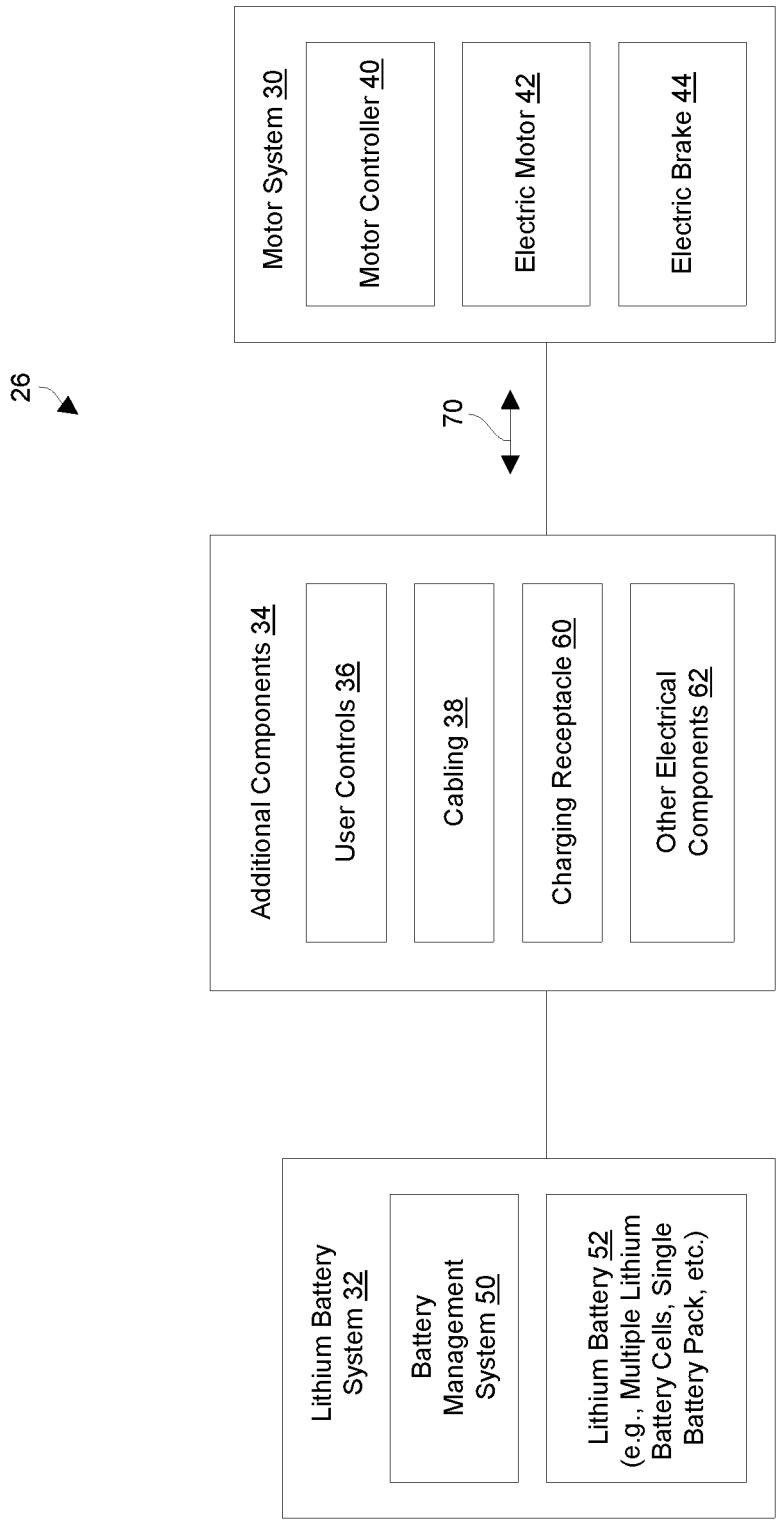
FIG. 2 is a block diagram of particular systems and components of the utility vehicle of FIG. 1 in accordance with some example embodiments.
Figure 3:
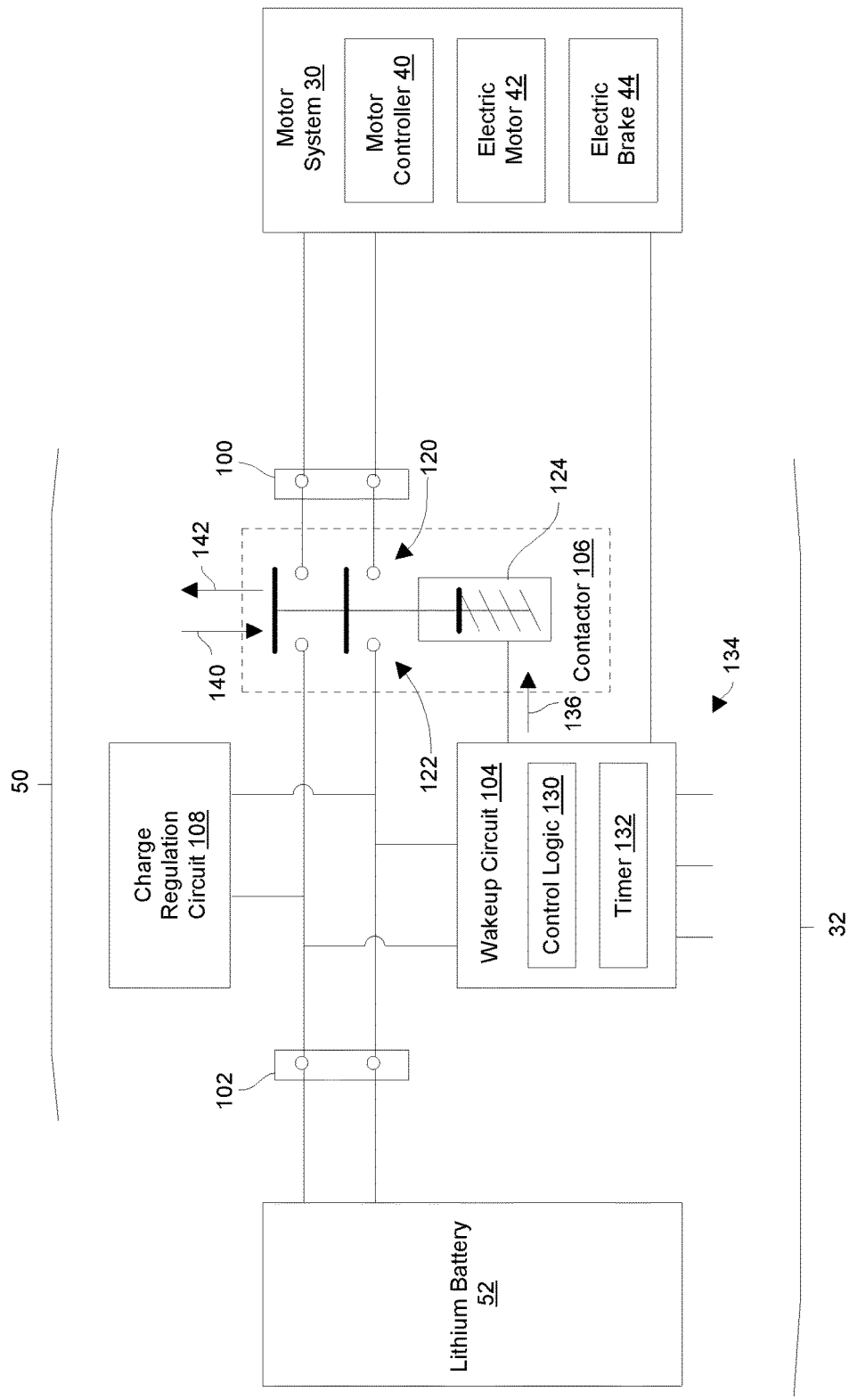
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40, an electric motor 42 which is linked to the set of tires 24 (FIG. 1), and an electric brake 44 coupled with the electric motor 42. The motor controller 40 of some embodiments controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (i.e., the utility vehicle 20 is awake but a user is not pressing on the accelerator pedal, the utility vehicle 20 is turned off, etc.), the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events such as sleep events (e.g., timeouts) to prevent excessive discharging of the lithium battery 52 thus safeguarding the lithium battery 52 from becoming over discharged. In some embodiments, the BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging receptacle 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
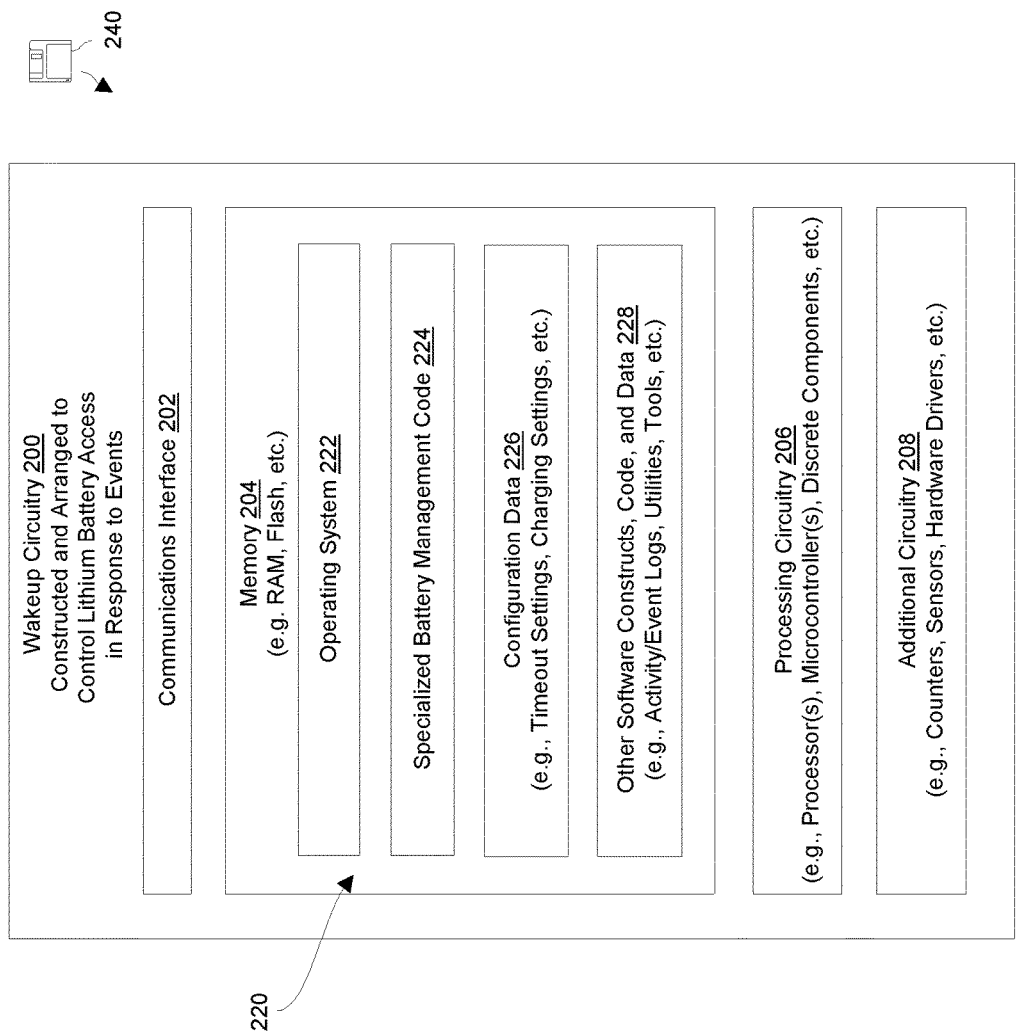
FIG. 4 is a block diagram of particular details of a wakeup circuit of a battery management system of the utility vehicle of FIG. 1 in accordance with some example embodiments.
Figure 5:
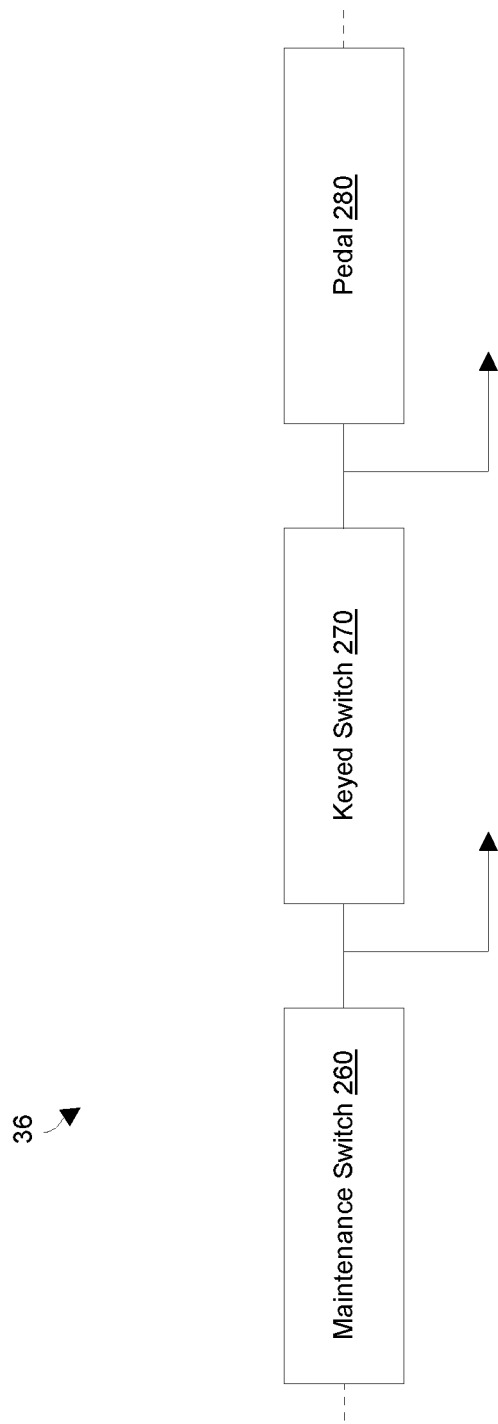
FIG. 5 is a block diagram of a first arrangement of particular user controls that provide input to the wakeup circuit of FIG. 4 in accordance with some example embodiments.
Figure 6:
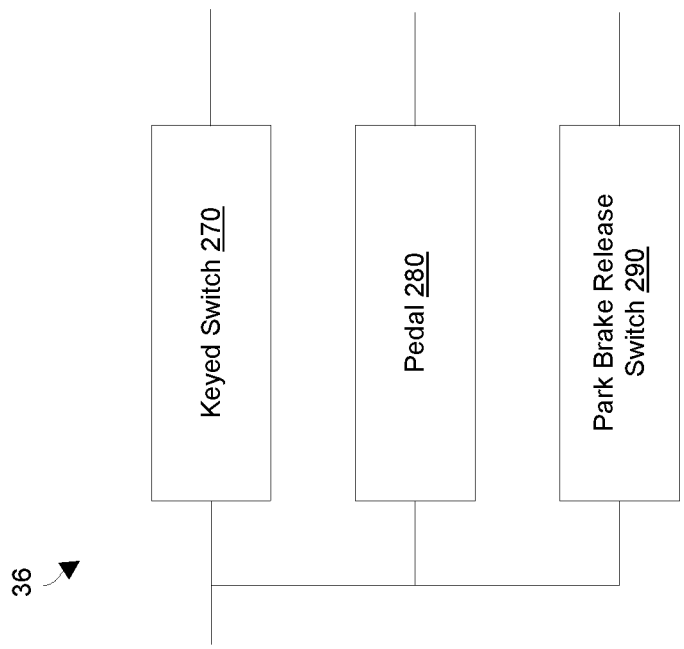
FIG. 6 is a block diagram of a second arrangement of particular user controls that provide input to the wakeup circuit of FIG. 4 in accordance with some example embodiments.

FIGS. 4 through 5 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which directs the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 reaches the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the lithium battery 52 thus improving efficiency.

Charging

Figure 7:
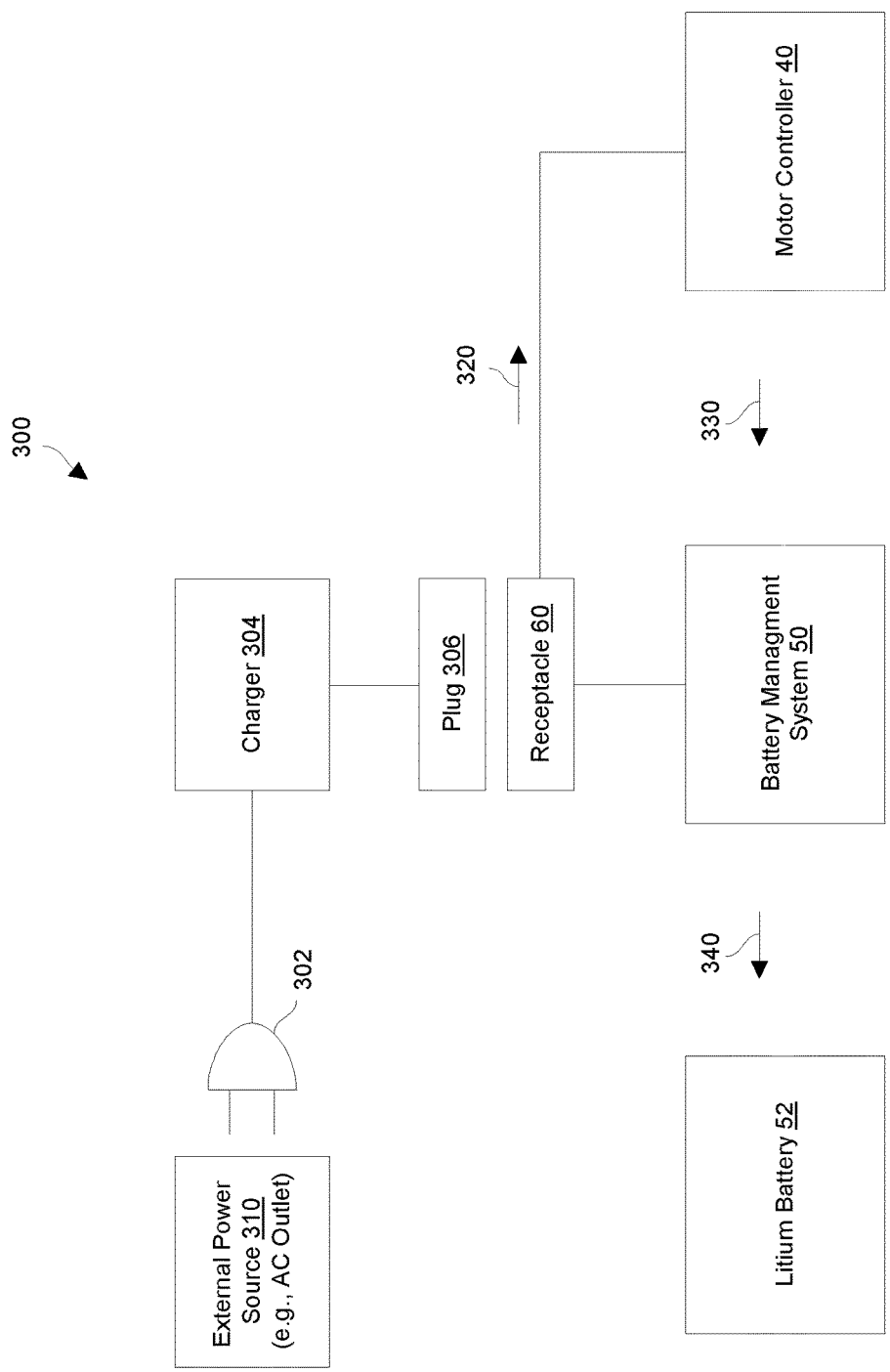
FIG. 7 is a block diagram of particular charging circuitry of the utility vehicle of FIG. 1 in accordance with some example embodiments.

FIG. 7 shows particular details of the charging circuitry 300 which charges the lithium battery 52 of the utility vehicle 20 (also see FIG. 1), in accordance with some example embodiments. In accordance with the embodiments illustrated in FIG. 7, the charging circuitry 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging receptacle 60 of the utility vehicle 20 (also see FIG. 2). The charger 304 is constructed and arranged to convert and condition a power signal from the external power source 310 for use by the utility vehicle 20.

As further shown in FIG. 7, the charging receptacle 60 electrically couples with the motor controller 40 and the battery management system (BMS) 50. Accordingly, when the receptacle 60 receives power from the charging circuitry 300, the receptacle 60 provides power to the motor controller 40 and BMS 50. In some embodiments, this initial power from the charging circuitry 300 wakes up the BMS 50 and the motor controller 40 (FIG. 3). In some embodiments, the receptacle 60 also provides an interlock signal 320 to the motor controller 40 which has also woken up. In response to the interlock signal 320, the motor controller 40 outputs a communication 330 (e.g., a CAN message) that informs the BMS 50 that the charging circuitry 300 is plugged in to the receptacle 60 and the BMS 50 then closes the contactor 106. With the contactor 106 now closed, the BMS 50 conveys a charging signal 340 from the charging circuitry 300 to the lithium battery 52. In some arrangements, the charge regulation circuit 108 (FIG. 3) conditions the charging signal 340 to properly charge the lithium battery 52.

While the lithium battery 52 charges in response to receipt of the charge signal 340 and in accordance with some embodiments, the BMS 50 monitors the lithium battery 52 to prevent overcharging. In particular, in response to sensing that the lithium battery 52 has charged to a predefined maximum charge threshold (or level), the BMS 50 deactivates the charge regulation circuit 108, e.g., sets the duty cycle of pulse width modulation (PWM) circuitry back to 0%, where other pulse widths determine different charging rates. In some arrangements, the BMS 50 then immediately goes to sleep. In other arrangements, the BMS imposes a timeout (e.g., 30 minutes) and goes to sleep if the timeout period expires without further user activity.

Further Details

Figure 8:
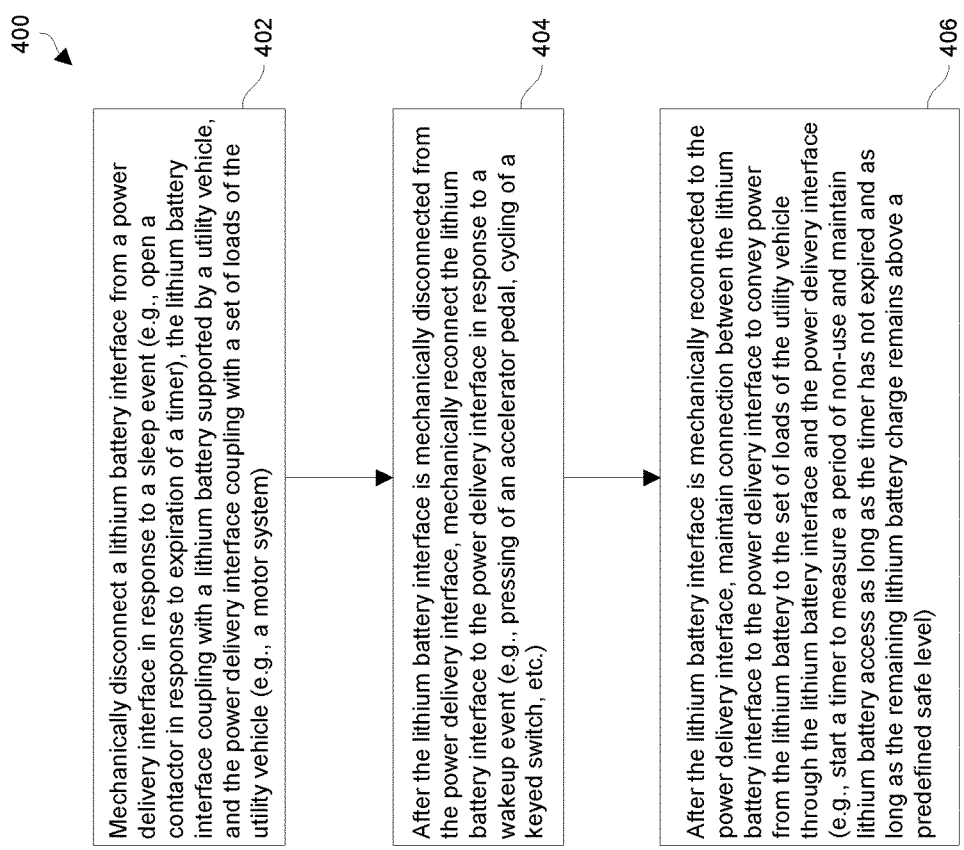
FIG. 8 is a flowchart of a procedure which is performed by the battery management system of the utility vehicle of FIG. 1 in accordance with some example embodiments.

FIG. 8 is a flowchart of a procedure 400 which is performed by the battery management system (BMS) 50 of the utility vehicle 20 to control access to the lithium battery 52 in accordance with some example embodiments.

At 402, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 404, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 406, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

Fault Handling

Figure 9:
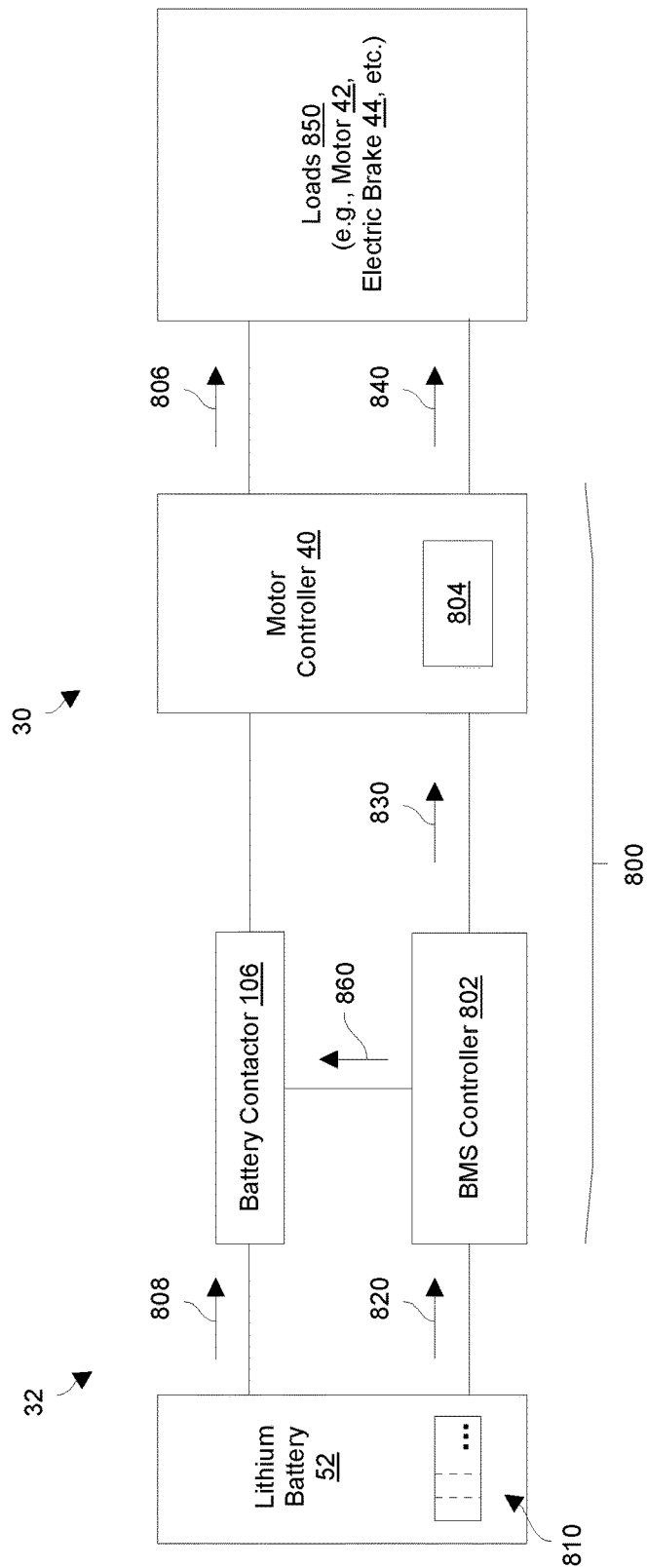
FIG. 9 is a block diagram of particular control circuitry details during fault handling in accordance with some embodiments.

FIG. 9 shows particular control circuitry 800 which operates to handle fault conditions that impact the lithium battery 52. In some embodiments, the control circuitry 800 includes a BMS controller 802 of the lithium battery system 32 and certain circuitry 804 of the motor controller 40 of the motor system 30 (also see FIG. 2). In some embodiments, the BMS controller 802 is formed by control logic and timing circuitry of the BMS 50 (e.g., also see the control logic 130 and timer 132 in FIG. 3).

In some embodiments, the BMS controller 802 monitors a variety of lithium battery operating parameters and conveys certain lithium battery information to the circuitry 804 of the motor controller 40. The circuitry 804 of the motor controller 40 uses this information, combined with information from other components of the utility vehicle 20, to determine proper control signals 806 (e.g., the proper voltages and currents to apply to the motor 42, to the electric brake 44, etc.) to achieve the desired lithium battery electrical response and/or vehicle motion. In some embodiments, the other components of the utility vehicle 20 include the throttle pedal, the brake pedal, a speed sensor, a directional control, as well as other inputs (also see the additional components 34 in FIG. 2).

In some embodiments, the lithium battery 52 that provides the power signal 808 includes multiple lithium modules 810. Each lithium module 810 may include several lithium cells as well as circuitry to output individual status information such as that module's minimum and maximum voltage, that module's minimum and maximum temperature, and so on. In some embodiments, the lithium battery operating parameters that are monitored by the BMS controller 802 include the respective status information from each lithium module 810 as well as other information such as overall current, voltage, etc. The BMS controller 802 then processes this information 820 and sends at least some of this lithium battery information in communications 830 to the circuitry 804 of the motor controller 40 (also see communications 70 in FIG. 2). In some embodiments, the BMS controller 802 sends status, warnings, faults, battery voltage, current and cell voltage and temperature information to the circuitry 804 (e.g., as a set of CAN messages over the CAN bus).

When a fault situation occurs and is detected by the control circuitry 800, the control circuitry 800 reacts to the fault situation by performing a set of remedial operations (i.e., one or more remedial operations) to address the fault situation. In some embodiments, the control circuitry 800 attempts to adjust motor system operation by providing a set of control signals 840 to various loads 850 to remove the fault situation within a predefined amount of time or disconnects the lithium battery 52 via a contactor control signal 860 if the fault situation is not rectified within the predefined amount of time. Recall that, in some embodiments, removal of an actuator signal 136 to the contactor 106 opens the contactor 106 (also see FIG. 3). In some embodiments, a suitable predefined amount of time is within the range of 1 to 6 seconds (e.g., 2 seconds, 3 seconds, 4 seconds, etc.).

In some embodiments, the BMS controller 802 is configured to identify fault situations that impact the lithium battery 52 and notify the circuitry 804 of the motor controller 40 to handle the fault situations. That is, the circuitry 804 of the motor controller 40 decides what remedial operations should take place to address the fault situations and then carries them out.

In other embodiments, the BMS controller 802 not only identifies the fault situations but also determines what remedial operations should take place to address the fault situations. In these embodiments, the BMS controller 802 then sends instructions to the motor controller 40 to carry them out.

In accordance with some embodiments, the BMS controller 802 utilizes a timer that is configured to expire after the predefined amount of time has elapsed. The BMS controller 802 starts the timer in response to detecting a fault situation that impacts the lithium battery 52. The BMS controller 802 maintains closure of the contactor 106 in response to detecting removal of the fault situation before timer expiration. However, the BMS controller 802 opens the contactor 106 in response to detecting that the fault situation continues to exist at timer expiration. Such operation allows time to either react in a way that clears the fault situation or slow down the utility vehicle 20 before disconnecting the lithium battery 52, or even both.

Along these lines, suppose that the BMS controller 802 senses a fault situation such as extremely low lithium battery voltage, i.e., lithium battery voltage that is less than a predefined voltage threshold. In some embodiments, the BMS controller 802 provides one or more low battery voltage signals to the circuitry 804 of the motor controller 40 (e.g., see arrow 830 in FIG. 9). In some embodiments, the BMS controller 802 provides the current battery voltage (arrow 830) to the circuitry 804 of the motor controller 40, and the motor controller 40 determines whether the current battery voltage is too low by comparing the current battery voltage to a set of predefined limits. The circuitry 804 reduces power to the motor 42 in response to a low battery voltage determination to prevent over-discharge of the lithium battery 52.

In some embodiments, if the battery voltage continues to drop despite the motor controller's response, the control circuitry 800 logs the fault condition in memory, e.g., the BMS controller 802 sets a fault bit. Additionally, the BMS controller 802 starts the timer.

If this fault situation was not cured by the predefined time limit, the BMS controller 802 opens the contactor 106. In some embodiments, the speed of the utility vehicle 20 is nevertheless reduced during that time thus slowing the utility vehicle 20 before the contactor 106 opens.

In some embodiments, the utility vehicle 20 is equipped with an electric brake 44 which engages as soon as contactor 106 opens. However, since the set of remedial operations included slowing the utility vehicle 20 before opening the contactor 106, the utility vehicle 20 was able to stop less abruptly than if the contactor 106 opened immediately after the fault condition was detected.

It should be understood that the above-described low lithium battery situation was provided by way of example, and that the control circuitry 800 is capable of addressing other situations as well. In some embodiments, the motor controller 40 receives messages reporting voltage, current, temperature, etc. (see arrow 830 in FIG. 9) and reacts appropriately. Accordingly, in some embodiments, the motor controller 40 determines whether the lithium battery system 32 is approaching a condition that would cause the BMS controller 802 to set the fault bit and responds before the fault bit is set.

In some embodiments, the control circuitry 800 reduces power generation (e.g., charging by regenerative braking) in response to high battery voltage to prevent overcharging. In some embodiments, the control circuitry 800 reduces power consumption due to high battery temperature to prevent increasing the battery temperature due to vehicle loads. In some embodiments, the control circuitry 800 is configured with a predefined list of fault conditions, and arranged to take remedial action in response to detection of one or more of the listed fault conditions.

In some embodiments, the control circuitry 800 brings the utility vehicle 20 to a stop before opening the contactor 106. In particular, the motor controller 40 de-energizes the electric brake 44 just before the contactor 106 opens. Such operation prevents a situation in which the vehicle 20 is still in motion when the contactor 106 disconnects the source of electric power to the vehicle loads. Further details will be provided with reference to FIG. 10.

Figure 10:
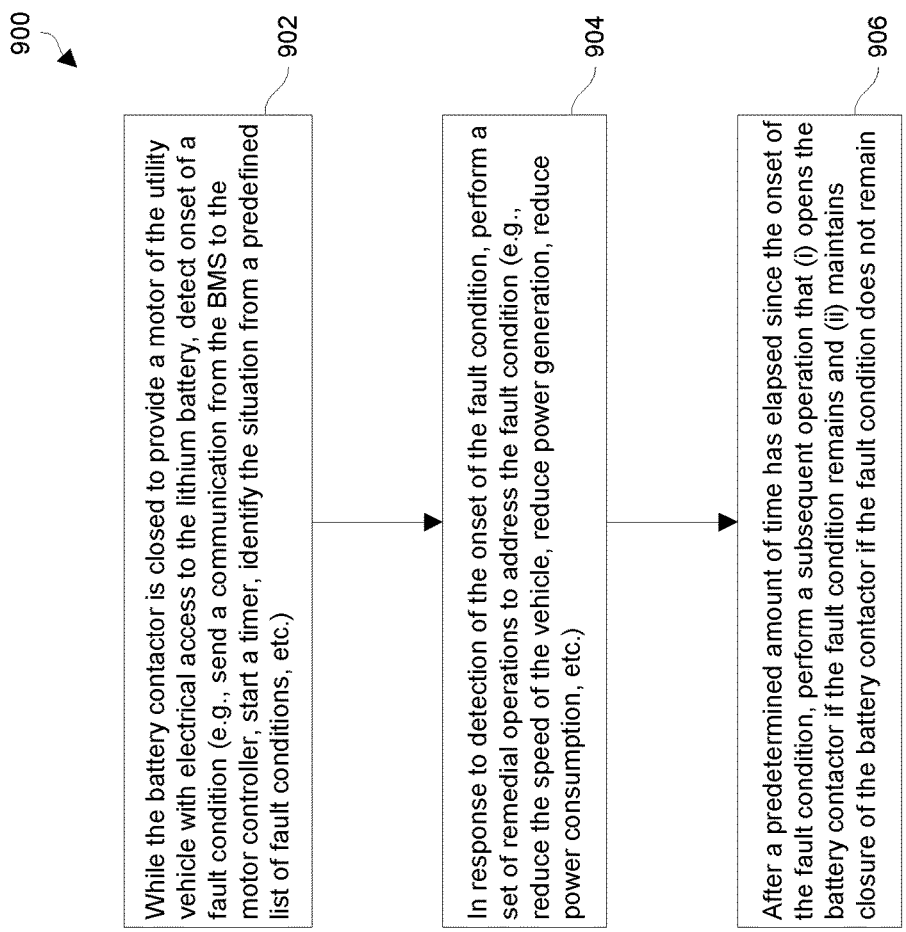
FIG. 10 is a flowchart of a procedure which is performed by control circuitry of the utility vehicle during fault handling in accordance with some embodiments.

FIG. 10 is a flowchart of a procedure 900 which is performed by the control circuitry 800 (FIG. 9) of the utility vehicle 20 during fault handling. Initially, suppose that the utility vehicle 20 is in operation and moving.

At 902, while the battery contactor is closed to provide a motor of the lithium-battery powered utility vehicle with electrical access to the lithium battery, the control circuitry 800 detects onset of a fault condition. In some embodiments, circuitry of the BMS 50 detects the fault situation and communicates the fault situation to circuitry of the motor controller 40. In some embodiments, the control circuitry 800 starts a timer that expires after a predefined amount of time (e.g., 3 seconds).

At 904, the control circuitry 800 performs, in response to detection of the onset of the fault condition, a set of remedial operations to address the fault condition. For example, as remedial activity, the control circuitry 800 may slow down the motor 42, may reduce power to the motor, or both in an attempt to clear the fault condition. Reducing the speed of the utility vehicle 20 provides the additional advantage of preventing the utility vehicle 20 from stopping abruptly.

At 906, the control circuitry 800 performs, after a predefined amount of time has elapsed since the onset of the fault condition, a subsequent operation which (i) opens the battery contactor if the fault condition remains and (ii) maintains closure of the battery contactor if the fault condition does not remain. In some embodiments, at 906, the control circuitry 800 includes determining whether the fault condition remains, e.g., prior to performing the subsequent operation. If the fault condition was removed before the predefined amount of time elapsed, the control circuitry 800 does not need to open the contactor.

As described above, improved techniques are directed to providing control circuitry 800 of a utility vehicle 20 with time (e.g., a predefined amount of time) to react in response to detection of a fault condition before the control circuitry 800 determines whether to disconnect a lithium battery 52 of the utility vehicle 20. This allows time for the control circuitry 800 to react in a way that clears the fault condition or slows down the utility vehicle 20 before disconnecting the lithium battery 52. Such operation provides an opportunity for the fault condition to be corrected thus avoiding disconnection as well as enables the utility vehicle 20 to come to a more gradual stop if the fault condition is not corrected.

While various embodiments of the present disclosure have been particularly shown and described, it will be understood by those skilled in the art that various changes in form and details may be made therein without departing from the spirit and scope of the present disclosure as defined by the appended claims.

One should appreciate that a lithium battery may be provisioned with a battery management system, BMS, that has the ability to disconnect the lithium battery from loads if unsafe conditions are sensed. The disconnect mechanism in vehicles may be a contactor. In some utility vehicles, an electric brake is energized to be released and allow vehicle motion. Sudden disconnection of the lithium battery from the vehicle's electrical system results in loss of speed control of the traction motor by the motor controller, and setting of the electric brake could suddenly stop the vehicle. This would not be a pleasant experience for the operator. In other utility vehicles that are not equipped with electric brakes, suddenly interrupting power to the motor controller would nevertheless result in sudden loss of speed control.

Out of range voltages, temperatures, and currents could cause the BMS to open its contactor, suddenly disabling the vehicle. In some embodiments, to prevent this, the BMS and the motor controller routinely communicate (e.g., over the CAN bus). In some embodiments, the BMS reports conditions that could cause faults so that the motor controller can react before the fault is asserted. For example, the motor controller can prevent over discharge by reducing power to the motor when the BMS reports low voltage.

In some embodiments, when a fault condition occurs, the BMS informs the motor controller three seconds before opening its contactor. This allows time for the motor controller to either react in a way that clears the fault condition, or slows down the vehicle before the contactor opens.

In some embodiments, the BMS routinely sends status, warning, fault, battery voltage, current and cell voltage, temperature information, and so on to the motor controller (e.g., over the CAN bus). The motor controller uses this information, combined with information from the throttle pedal, brake pedal, speed sensor, directional control, and other inputs to determine the proper voltages and currents to apply to the motor to achieve the desired vehicle motion. In some embodiments, in order to prevent BMS faults, the motor controller reacts to warnings and predefined extreme voltage, temperature, currents, etc. This reaction typically involves limiting power to the motor until the condition clears. The motor controller may perform control algorithms based on voltage, current, temperatures, etc. that the motor controller measures itself. In some embodiments, for lithium, these algorithms are enhanced to react to additional conditions that are reported from the BMS (e.g., over the CAN bus).

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event). Such modifications and enhancements are intended to belong to various embodiments of the disclosure.

What is claimed is:

1. A control system for a utility vehicle, the control system comprising:
   a lithium battery;
   a battery contactor configured to control electrical access to the lithium battery; and
   control circuitry coupled with the lithium battery and the battery contactor, the control circuitry being configured to:
      while the battery contactor is closed to provide a set of loads of the utility vehicle with electrical access to the lithium battery, detect onset of a fault condition,
      in response to detection of the onset of the fault condition, perform a set of remedial operations to address the fault condition, and
      after a predefined amount of time has elapsed since the onset of the fault condition, perform a subsequent operation which (i) opens the battery contactor if the fault condition remains and (ii) maintains closure of the battery contactor if the fault condition does not remain;
   wherein the control circuitry is constructed and arranged to energize an electric brake to allow the utility vehicle to move while detecting onset of the fault condition;
   wherein the control circuitry, when performing the set of remedial operations to address the fault condition, is constructed and arranged to:
      de-energize, as one of the set of remedial operations, the electric brake to stop rotation of an electric motor of the utility vehicle prior to opening the battery contactor to prevent the utility vehicle from stopping abruptly; and
   wherein opening the battery contactor disconnects the electric motor from access to electric power.

2. A control system as in claim 1 wherein the set of loads of the utility vehicle includes the electric motor which is configured to provide motion to the utility vehicle;
   wherein the control circuitry includes:
      a lithium battery managements system (BMS) controller coupled with the lithium battery and the battery contactor, the lithium BMS controller being configured to identify fault situations that impact the lithium battery, and
      a motor controller coupled with the lithium BMS controller and the motor, the motor controller being configured operate the motor based at least in part on the fault situations which are identified by the lithium BMS controller.

3. A control system as in claim 2 wherein the motor controller is configured to:
   perform a set of decision making operations based at least in part on the fault situations which are identified by the lithium BMS controller, and
   control the electric motor based at least in part on a set of results of the set of decision making operations.

4. A control system as in claim 3 wherein the set of decision making operations performed by the motor controller is based at least in part on a set of lithium battery conditions sensed by the lithium BMS controller and conveyed by the lithium BMS controller to the motor controller.

5. A control system as in claim 4 wherein the set of lithium battery conditions includes lithium battery voltage, lithium battery current, and lithium battery temperature.

6. A control system as in claim 5 wherein the set of decision making operations performed by the motor controller is further based on a set of motor control conditions sensed by the motor controller, the set of motor control conditions including throttle pedal status from a throttle pedal of the utility vehicle, brake pedal status from a brake pedal of the utility vehicle, motor speed from a speed sensor of the utility vehicle, and direction status from a direction control switch of the utility vehicle.

7. A control system as in claim 2 wherein the lithium BMS controller is configured to:
perform a set of decision making operations based at least in part on the fault situations which are identified by the lithium BMS controller; and
wherein the motor controller is configured to:
control the electric motor based at least in part on a set of results of the set of decision making operations.

8. A control system as in claim 2 wherein the motor controller is configured to:
reduce the speed of the electric motor to slow the utility vehicle in response to the fault situations which are identified by the lithium BMS controller.

9. A control system as in claim 2 wherein the lithium BMS controller is configured to:
provide a low battery voltage signal to the motor controller in response to sensing, from the lithium battery, a lithium battery voltage that is less than a predefined voltage threshold; and
wherein the motor controller is configured to:
reduce power to the electric motor in response to the low battery voltage signal to prevent over-discharge of the lithium battery.

10. A control system as in claim 9 wherein the lithium BMS controller and the motor controller communicate through a controller area network (CAN) bus of the utility vehicle; and
wherein the lithium BMS controller is configured to:
provide the low battery voltage signal to the motor controller as a set of CAN messages through the CAN bus.

11. A control system as in claim 2 wherein the lithium BMS controller includes control logic and a timer that couples with the control logic;
wherein the timer is configured to expire after the predefined amount of time has elapsed; and
wherein the control logic is configured to:
start the timer in response to detecting a fault situation that impacts the lithium battery, and
open the battery contactor in response to detecting that the fault situation that impacts the lithium battery continues to exist at timer expiration.

12. A control system as in claim 2 wherein the lithium BMS controller includes control logic and a timer that couples with the control logic;
wherein the timer is configured to expire after the predefined amount of time has elapsed; and
wherein the control logic is configured to:
start the timer in response to detecting a fault situation that impacts the lithium battery, and
maintain closure of the battery contactor in response to detecting removal of the fault situation before timer expiration.

13. A control system as in claim 2 wherein the motor controller is further configured to operate the electric brake which is configured to (i) provide mechanical resistance which inhibits the electric motor from turning when the electric brake is unpowered and (ii) remove the mechanical resistance to allow the electric motor to turn when power is provided to the electric brake.

14. A control system as in claim 13 wherein the set of remedial operations includes controlling operation of the electric brake.

15. A control system as in claim 1 wherein the set of remedial operations includes reducing power generation in response to detection of a current battery voltage of the lithium battery exceeding a predefined maximum battery voltage to prevent overcharging of the lithium battery.

16. A control system as in claim 1 wherein the set of remedial operations includes reducing power consumption by the set of loads in response to detection of a current temperature of the lithium battery exceeding a predefined maximum battery temperature to prevent increasing temperature of the lithium battery due to power consumption by the set of loads.

17. A utility vehicle, comprising:
a utility vehicle body;
an electric motor supported by the utility vehicle body; and
a control system coupled with the motor, the control system including:
a lithium battery,
a battery contactor configured to control electrical access to the lithium battery, and
control circuitry coupled with the lithium battery and the battery contactor, the control circuitry being configured to:
while the battery contactor is closed to provide the motor with electrical access to the lithium battery, detect onset of a fault condition,
in response to detection of the onset of the fault condition, perform a set of remedial operations to address the fault condition, and
after a predefined amount of time has elapsed since the onset of the fault condition, perform a subsequent operation which (i) opens the battery contactor if the fault condition remains and (ii) maintains closure of the battery contactor if the fault condition does not remain;
wherein the control circuitry is constructed and arranged to energize an electric brake to allow the utility vehicle to move while detecting onset of the fault condition;
wherein the control circuitry, when performing the set of remedial operations to address the fault condition, is constructed and arranged to:
de-energize, as one of the set of remedial operations, the electric brake to stop rotation of the electric motor prior to opening the battery contactor to prevent the utility vehicle from stopping abruptly; and
wherein opening the battery contactor disconnects the electric motor from access to electric power.

18. A utility vehicle as in claim 17 wherein the control circuitry includes:
a lithium battery managements system (BMS) controller coupled with the lithium battery and the battery contactor, the lithium BMS controller being configured to identify fault situations that impact the lithium battery, and
a motor controller coupled with the lithium BMS controller and the electric motor, the motor controller being configured operate the electric motor based at least in part on the fault situations that impact the lithium battery.

19. A utility vehicle as in claim 18 wherein lithium BMS controller includes control logic and a timer that couples with the control logic;

wherein the timer is configured to expire after the predefined amount of time has elapsed; and
wherein the control logic is configured to:
  start the timer in response to detecting a fault situation that impacts the lithium battery,
  maintain closure of the battery contactor in response to detecting removal of the fault situation before timer expiration, and
  open the battery contactor in response to detecting that the fault situation that impacts the lithium battery continues to exist at timer expiration.

20. A utility vehicle as in claim 19 wherein the lithium BMS controller is configured to:
provide a low battery voltage signal to the motor controller in response to sensing, from the lithium battery, a lithium battery voltage that is less than a predefined voltage threshold; and
wherein the motor controller is configured to:
  reduce power to the electric motor in response to the low battery voltage signal to prevent over-discharge of the lithium battery.

21. In a lithium-battery powered utility vehicle, a method of handling a fault condition, the method comprising:
while a battery contactor is closed to provide an electric motor of the lithium-battery powered utility vehicle with electrical access to the lithium battery, detecting onset of a fault condition,
in response to detection of the onset of the fault condition, performing a set of remedial operations to address the fault condition, and
after a predefined amount of time has elapsed since the onset of the fault condition, performing a subsequent operation which (i) opens the battery contactor if the fault condition remains and (ii) maintains closure of the battery contactor if the fault condition does not remain;
wherein control circuitry of the lithium battery powered utility vehicle is constructed and arranged to energize an electric brake to allow the vehicle to move while detecting onset of the fault condition;
wherein performing the set of remedial operations to address the fault condition includes:
de-energizing, by the control circuitry and as one of the set of remedial operations, the electric brake to stop rotation of the electric motor of the lithium battery powered utility vehicle prior to opening the battery contactor to prevent the lithium battery powered utility vehicle from stopping abruptly; and
wherein opening the battery contactor disconnects the electric motor from access to electric power.

* * * * *